US012046217B2

(12) United States Patent
Lin et al.

(10) Patent No.: US 12,046,217 B2
(45) Date of Patent: Jul. 23, 2024

(54) COLOR CORRECTION METHOD AND COLOR CORRECTION DEVICE FOR OBTAINING TARGET GAMMA INFORMATION OF A TARGET COLOR SPACE

(71) Applicant: Acer Incorporated, New Taipei (TW)

(72) Inventors: Tzu-Chieh Lin, New Taipei (TW); Chen-Kang Su, New Taipei (TW)

(73) Assignee: Acer Incorporated, New Taipei (TW)

( * ) Notice: Subject to any disclaimer, the term of this patent is extended or adjusted under 35 U.S.C. 154(b) by 117 days.

(21) Appl. No.: 17/970,554

(22) Filed: Oct. 20, 2022

(65) Prior Publication Data

US 2024/0013750 A1 Jan. 11, 2024

(30) Foreign Application Priority Data

Jul. 7, 2022 (TW) ................................. 111125443

(51) Int. Cl.
*G09G 5/06* (2006.01)

(52) U.S. Cl.
CPC ....... *G09G 5/06* (2013.01); *G09G 2320/0666* (2013.01); *G09G 2320/0673* (2013.01); *G09G 2340/06* (2013.01)

(58) Field of Classification Search
CPC ............. G09G 5/06; G09G 2320/0666; G09G 2320/0673; G09G 2340/06; G09G 2320/0242; G09G 2320/0693
See application file for complete search history.

(56) References Cited

U.S. PATENT DOCUMENTS

| | | | | |
|---|---|---|---|---|
| 2005/0201615 A1* | 9/2005 | Hsu | H04N 9/69 | 358/1.9 |
| 2006/0250412 A1* | 11/2006 | Chen | G06T 11/001 | 345/589 |
| 2008/0309766 A1* | 12/2008 | Lin | H04N 9/69 | 348/179 |
| 2014/0118387 A1* | 5/2014 | Kim | H04N 9/69 | 345/590 |
| 2016/0307540 A1* | 10/2016 | Holland | G09G 5/14 | |

FOREIGN PATENT DOCUMENTS

| | | |
|---|---|---|
| CN | 102110429 | 6/2011 |
| TW | 201129077 | 8/2011 |

* cited by examiner

*Primary Examiner* — Maurice L. McDowell, Jr.
(74) *Attorney, Agent, or Firm* — JCIPRNET

(57) ABSTRACT

Embodiments of the disclosure provide a color correction method and a color correction device. The method includes: obtaining native gamma information and native color point information of a display; obtaining target gamma information and target color point information of a target color space; obtaining a gamma correction parameter associated with the display based on the native gamma information and the target gamma information; determining a first pseudo gamma parameter based on the target gamma information; determining a second pseudo gamma parameter based on an inverse gamma operation of the target gamma information; determining a pseudo color space conversion matrix based on the native color point information and the target color point information; and updating a 3D lookup table of the display based on the first pseudo gamma parameter, the pseudo color space conversion matrix, and the second pseudo gamma parameter in sequence.

16 Claims, 4 Drawing Sheets

COLOR CORRECTION METHOD AND COLOR CORRECTION DEVICE FOR OBTAINING TARGET GAMMA INFORMATION OF A TARGET COLOR SPACE

CROSS-REFERENCE TO RELATED APPLICATION

This application claims the priority benefit of Taiwan application serial no. 111125443, filed on Jul. 7, 2022. The entirety of the above-mentioned patent application is hereby incorporated by reference herein and made a part of this specification.

BACKGROUND

Technical Field

This disclosure is related to a display technique, and in particular relates to a color correction method and a color correction device.

Description of Related Art

Generally speaking, electronic products such as notebook computers and all-in-one (AIO) computers all include displays, and the display color accuracy of the displays is one of the performance indicators of these products. For example, the closer the display color of an sRGB display is to the standard sRGB color, the more accurate it is.

In addition, current display products may also provide different color spaces for users to select and switch. For example, the display may allow the user to switch between sRGB, AdobeRGB, or other color spaces.

For users (especially those who require higher color accuracy), if the display may achieve corresponding color accuracy in different color spaces, user experience may be improved.

To calibrate display colors, a developer may design a color calibration method according to an accessible color adjustment function module provided by a graphics processing unit (GPU) developer (for example, gamma, color space convert (CSC), 3D lookup table (3D-LUT, etc.)) and parameters thereof to calibrate the display colors.

FIG. 1A is a schematic diagram of a conventional color calibration means. In FIG. 1A, it is assumed that a GPU developer may provide a CSC module 112, and there are gamma modules 111 and 113 before and after the CSC module 112. Under this architecture, the developer may operate the CSC module 112 in a linear space via the gamma modules 111 and 113, and calibrate the color gamut and color temperature via the CSC module 112. At the same time, the gamma may also be calibrated via the gamma modules 111 and 113. The advantage of the mechanism in FIG. 1A is that the color gamut, color temperature, and gamma may be simultaneously corrected more accurately via a matching correction process method, so that the display color may be closer to the target color space. However, the GPU developer may not provide this architecture due to design resources and complexity considerations.

FIG. 1B is a schematic diagram of another conventional color calibration means. In the scenario of FIG. 1B, if the GPU developer only provides one CSC module 121 and one gamma module 122, it is difficult for the developer to make the CSC module 121 operate in a linear space, and it is difficult to accurately adjust the color gamut and color temperature via the CSC module 121. Therefore, the GPU developer may add one fixed gamma module 123 and one inverse gamma module 124 before and after the CSC module 121, which are usually based on sRGB.

Under this architecture, color gamut, color temperature, and gamma may also be accurately corrected for a specific target color space (e.g., sRGB). However, color accuracy may also be correspondingly limited to a specific target color space. For example, the approach of FIG. 1B may only be applicable to sRGB (gamma parameter of about 2.2), but not Theater-P3 (gamma parameter of 2.6). The reason is that if linearization is performed based on sRGB gamma, linearization effect is limited, which may affect the accuracy of the action of the CSC module 121.

SUMMARY

In view of this, embodiments of the disclosure provide a color correction method and a color correction device that may be used to solve the above technical issues.

An embodiment of the disclosure provides a color correction method suitable for a color correction device, including: obtaining native gamma information and native color point information of a display; obtaining target gamma information and target color point information of a target color space; obtaining at least one gamma correction parameter associated with the display based on the native gamma information and the target gamma information; determining a first pseudo gamma parameter based on the target gamma information; determining a second pseudo gamma parameter based on an inverse gamma operation of the target gamma information; determining a pseudo color space conversion matrix based on the native color point information and the target color point information; and updating a 3D lookup table of the display based on the first pseudo gamma parameter, the pseudo color space conversion matrix, and the second pseudo gamma parameter in sequence.

An embodiment of the disclosure provides a color correction device including a storage circuit and a processor. The storage circuit stores a program code. The processor is coupled to the storage circuit and stores a program code to perform: obtaining native gamma information and native color point information of a display; obtaining target gamma information and target color point information of a target color space; obtaining at least one gamma correction parameter associated with the display based on the native gamma information and the target gamma information; determining a first pseudo gamma parameter based on the target gamma information; determining a second pseudo gamma parameter based on an inverse gamma operation of the target gamma information; determining a pseudo color space conversion matrix based on the native color point information and the target color point information; and updating a 3D lookup table of the display based on the first pseudo gamma parameter, the pseudo color space conversion matrix, and the second pseudo gamma parameter in sequence.

DESCRIPTION OF THE EMBODIMENTS

Figure 2:
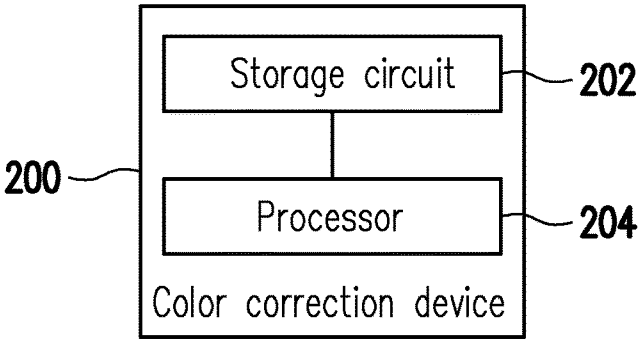
FIG. 2 is a schematic diagram of a color correction device shown according to an embodiment of the disclosure.

Please refer to FIG. 2, which is a schematic diagram of a color correction device shown according to an embodiment of the disclosure. In different embodiments, a color correction device 200 may be implemented as various smart devices and/or computer devices. In other embodiments, the color correction device 200 may also be implemented as a display, but may not be limited thereto.

In FIG. 2, the color correction device 200 includes a storage circuit 202 and a processor 204. The storage circuit 202 is, for example, any type of fixed or removable random-access memory (RAM), read-only memory (ROM), flash memory, hard disk, or other similar devices or a combination of these devices, and may be used to record a plurality of program codes or modules.

The processor 204 is coupled to the storage circuit 202 and may be a general-purpose processor, a special-purpose processor, a conventional processor, a digital signal processor, a plurality of microprocessors, one or a plurality of microprocessors combining digital signal processor cores, a controller, a microcontroller, an application-specific integrated circuit (ASIC), a field-programmable gate array (FPGA), any other types of integrated circuits, a state machine, a processor based on advanced RISC machines (ARM), and a similar product thereof.

In an embodiment of the disclosure, the processor 204 may access modules and program codes recorded in the storage circuit 202 to implement the method of color correction method proposed by the disclosure. The details are as follows.

Figure 3:
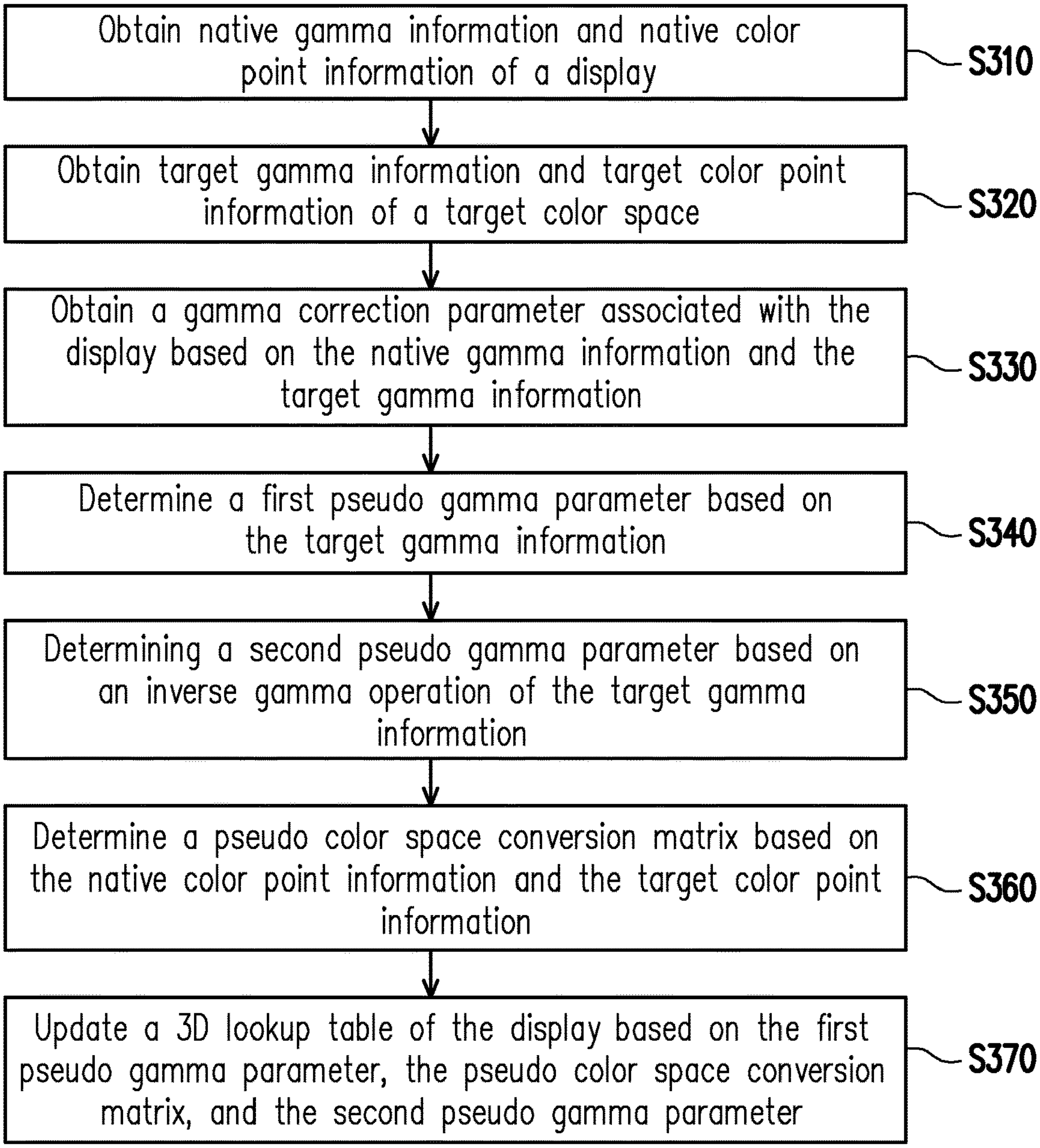
FIG. 3 is a flowchart of a color correction method shown according to an embodiment of the disclosure.

Please refer to FIG. 3, which is a flowchart of a color correction method shown according to an embodiment of the disclosure. The method of the present embodiment may be performed by the color correction device 200 of FIG. 2, and the details of each step of FIG. 3 are described below with the elements shown in FIG. 2.

In step S310, the processor 204 obtains native gamma information and native color point information of the display (hereinafter referred to as "S").

In an embodiment, the native gamma information of the display S may include the native gamma information of a plurality of colors, and the native color point information of the display S may include the respective native color point information of the plurality of colors.

In an embodiment of the disclosure, the plurality of colors may include, for example, a first color, a second color, a third color, and a reference color. For convenience of description, the first color, the second color, the third color, and the reference color are respectively assumed to be red, green, blue, and white (referred to as R, G, B, and W respectively below), but not limited thereto.

In an embodiment, the native gamma information of each of the colors may include the native gamma parameters of R, G, and B in the display S. In addition, the native color point information of each of the colors may include the native color point information of R, G, B, and W in the display A. In some embodiments, the native gamma information and/or the native color point information of each of the colors may be obtained by the current measurement of the method of FIG. 3, or obtained by prior measurement and stored in the data of the storage circuit 202, but may not be limited thereto.

In step S320, the processor 204 obtains the target gamma information and the target color point information of the target color space (hereinafter referred to as T).

In different embodiments, the considered target color space T may be a standard color space (e.g., sRGB, AdobeRGB, P3, etc.) commonly used by general displays or a specially defined color space. In different embodiments, the target color space T may be automatically determined and selected by the processor 204 according to the native characteristics of the display. In other embodiments, the target color space T may also be predetermined by the developer or selected by the user, but may not be limited thereto.

In an embodiment, the target gamma information of the target color space T may include target gamma information of each of the colors, such as target gamma parameters of R, G, and B in the target color space T. In addition, the target color point information of each of the colors may include target color point information of R, G, B, and W in the target color space T, but may not be limited thereto.

In step S330, the processor 204 obtains the gamma correction parameter associated with the display S based on the native gamma information and the target gamma information.

In an embodiment, the gamma correction parameter may include a first gamma correction parameter corresponding to R. In an embodiment, the processor 204 may perform a first gamma operation on the native gamma parameter (e.g., 2.0) of R based on the target gamma parameter (e.g., 2.2) of R to generate a first operation result. Next, the processor 204 may perform a first inverse gamma operation (e.g., a Gamma 1/2.0 operation) on the first operation result based on the native gamma parameter (e.g., 2.0) of R to generate a second operation result as the first gamma correction parameter corresponding to R.

In another embodiment, the processor 204 may also determine the first gamma correction parameter corresponding to R by looking up a table. For example, assuming that the native gamma parameter of R includes a first brightness corresponding to a plurality of color levels (e.g., 256 levels), and the target gamma parameter of R also includes a second brightness corresponding to the plurality of color levels, then, for example, the processor 204 may determine the first gamma correction parameter for correcting the first brightness to the second brightness based on the first brightness and the second brightness of the same color level, but may not be limited thereto.

In an embodiment, the gamma correction parameter may further include a second gamma correction parameter and a third gamma correction parameter corresponding to G and B, respectively. In this case, the processor 204 may perform an operation similar to those taught above for G and B to generate the second gamma correction parameter and the third gamma correction parameter corresponding to G and B, respectively.

For example, the processor 204 may perform a second gamma operation on the native gamma parameter (e.g., 2.0) of G based on the target gamma parameter (e.g., 2.2) of G to generate a third operation result. Next, the processor 204 may perform a second inverse gamma operation (e.g., a Gamma 1/2.0 operation) on the third operation result based on the native gamma parameter (e.g., 2.0) of G to generate a fourth operation result as the second gamma correction parameter corresponding to G.

As another example, the processor 204 may perform a third gamma operation on the native gamma parameter (e.g., 2.0) of B based on the target gamma parameter (e.g., 2.2) of B to generate a fifth operation result. Next, the processor 204 may perform a third inverse gamma operation (e.g., a Gamma 1/2.0 operation) on the fifth operation result based on the native gamma parameter (e.g., 2.0) of B to generate a sixth operation result as the third gamma correction parameter corresponding to B, but may not be limited thereto.

In addition, for G and B, the processor 204 may also determine the second gamma correction parameter and the third gamma correction parameter via the above table lookup method, and the details thereof are not repeated herein.

In step S340, the processor 204 determines the first pseudo gamma parameter based on the target gamma information. In an embodiment, the processor 204 may set the first pseudo gamma parameter as the target gamma parameter, or other gamma parameters close to the target gamma parameter, but may not be limited thereto. For example, assuming that the target gamma parameter is 2.2, the processor 204 may set the first pseudo gamma parameter to be 2.2 or other gamma parameters close to 2.2, but may not be limited thereto.

In step S350, the processor 204 determines the second pseudo gamma parameter based on the inverse gamma operation of the target gamma information. For example, assuming that the target gamma parameter is 2.2, the processor 204 may set the second pseudo gamma parameter to be 1/2.2 or other gamma parameters close to 1/2.2, but may not be limited thereto.

In step S360, the processor 204 determines a pseudo color space conversion matrix (represented by $M_{CSC}$) based on the native color point information and the target color point information.

In an embodiment, the native color point information of each of the colors may include the native coordinate value of each of the colors in the XYZ space, and the target color point information of each of the colors may include the target coordinate value of each of the colors in the XYZ space.

Based on this, the processor 204 may determine the first matrix (hereinafter referred to as $M_2$) based on the native coordinate value of each of the colors in the XYZ space and the native coordinate value of each of the colors in the RGB space.

In an embodiment, the first matrix may be characterized as:

$$M_1 = \begin{bmatrix} r_{R_S} & r_{G_S} & r_{B_S} & r_{W_S} \\ g_{R_S} & g_{G_S} & g_{B_S} & g_{W_S} \\ b_{R_S} & b_{G_S} & b_{B_S} & b_{W_S} \end{bmatrix} \begin{bmatrix} X_{R_S} & X_{G_S} & X_{B_S} & X_{W_S} \\ Y_{R_S} & Y_{G_S} & Y_{B_S} & Y_{W_S} \\ Z_{R_S} & Z_{G_S} & Z_{B_S} & Z_{W_S} \end{bmatrix}^{-1}, \quad \text{(formula 1)}$$

wherein $(r_{R_S}, g_{R_S}, b_{R_S})$ is the native coordinate value of R in the RGB space, $(r_{G_S}, g_{G_S}, b_{G_S})$ is the native coordinate value of G in the RGB space, $(r_{B_S}, g_{B_S}, b_{B_S})$ is the native coordinate value of B in the RGB space, and $(r_{W_S}, g_{W_S}, b_{W_S})$ is the native coordinate value of W in the RGB space. Moreover, $(X_{R_S}, Y_{R_S}, Z_{R_S})$ is the native coordinate value of R in the XYZ space, $(X_{G_S}, Y_{G_S}, Z_{G_S})$ is the native coordinate value of G in the XYZ space, $(X_{B_S}, Y_{B_S}, Z_{B_S})$ is the native coordinate value of B in the XYZ space, and $(X_{W_S}, Y_{W_S}, Z_{W_S})$ is the native coordinate value of W in the XYZ space.

In an embodiment of the disclosure, the native coordinate values of R, G, B, and W in the XYZ space and the RGB space are all already known, so the first matrix may be obtained directly based on the above formula 1, but may not be limited thereto.

Afterwards, the processor 204 may determine the target coordinate value of each of the colors in the RGB space based on the first matrix and the target coordinate value of each of the colors in the XYZ space.

In an embodiment, the target coordinate value of each of the colors in the RGB space is represented as:

$$\begin{bmatrix} r_{R_T} & r_{G_T} & r_{B_T} & r_{W_T} \\ g_{R_T} & g_{G_T} & g_{B_T} & g_{W_T} \\ b_{R_T} & b_{G_T} & b_{B_T} & b_{W_T} \end{bmatrix} = M_1 \begin{bmatrix} X_{R_T} & X_{G_T} & X_{B_T} & X_{W_T} \\ Y_{R_T} & Y_{G_T} & Y_{B_T} & Y_{W_T} \\ Z_{R_T} & Z_{G_T} & Z_{B_T} & Z_{W_T} \end{bmatrix}, \quad \text{(formula 2)}$$

wherein $(r_{R_T}, g_{R_T}, b_{R_T})$ is the target coordinate value of R in the RGB space, $(r_{G_T}, g_{G_T}, b_{G_T})$ is the target coordinate value of G in the RGB space, $(r_{B_T}, g_{B_T}, b_{B_T})$ is the target coordinate value of B in the RGB space, and $(r_{W_T}, g_{W_T}, b_{W_T})$ is the target coordinate value of W in the RGB space. Moreover, $(X_{R_T}, Y_{R_T}, Z_{R_T})$ is the target coordinate value of R in the XYZ space, $(X_{G_T}, Y_{G_T}, Z_{G_T})$ is the target coordinate value of G in the XYZ space, $(X_{B_T}, Y_{B_T}, Z_{B_T})$ is the target coordinate value of B in the XYZ space, and $(X_{W_T}, Y_{W_T}, Z_{W_T})$ is the target coordinate value of W in the XYZ space.

In an embodiment, since the first matrix and the target coordinate values of R, G, B, and W in the XYZ space are all already known, the target coordinate values of R, G, B, and W in the RGB space may be obtained directly based on formula 2, but may not be limited thereto.

Next, the processor 204 may determine the pseudo color space conversion matrix based on the native coordinate value of each of the colors in the RGB space and the target coordinate value of each of the colors in the RGB space.

In an embodiment, the pseudo color space conversion matrix may be characterized as:

$$M_{CSC} = \begin{bmatrix} r_{R_T} & r_{G_T} & r_{B_T} & r_{W_T} \\ g_{R_T} & g_{G_T} & g_{B_T} & g_{W_T} \\ b_{R_T} & b_{G_T} & b_{B_T} & b_{W_T} \end{bmatrix} \begin{bmatrix} r_{R_S} & r_{G_S} & r_{B_S} & r_{W_S} \\ g_{R_S} & g_{G_S} & g_{B_S} & g_{W_S} \\ b_{R_S} & b_{G_S} & b_{B_S} & b_{W_S} \end{bmatrix}^{-1}.$$

In step S370, the processor 204 updates the 3D lookup table of the display S based on the first pseudo gamma parameter, the pseudo color space conversion matrix, and the second pseudo gamma parameter in sequence.

In an embodiment, the 3D lookup table of the display S may include individual RGB output values of a plurality of sampling points, which may be exemplified in Table 1 below.

TABLE 1

| Sampling point | Output value | | |
|---|---|---|---|
| number | r | g | b |
| 1 | 0/(N − 1) | 0/(N − 1) | 0/(N − 1) |
| 2 | 0/(N − 1) | 0/(N − 1) | 1/(N − 1) |
| 3 | 0/(N − 1) | 0/(N − 1) | 2/(N − 1) |
| . . . | . . . | . . . | . . . |
| N | 0/(N − 1) | 0/(N − 1) | (N − 1)/(N − 1) |
| . . . | . . . | . . . | . . . |
| $N^2$ | 0/(N − 1) | (N − 1)/(N − 1) | (N − 1)/(N − 1) |
| . . . | . . . | . . . | . . . |
| $N^3 - 1$ | (N − 1)/(N − 1) | (N − 1)/(N − 1) | (N − 2)/(N − 1) |
| $N^3$ | (N − 1)/(N − 1) | (N − 1)/(N − 1) | (N − 1)/(N − 1) |

In the scenario of Table 1, the 3D lookup table of the display S is, for example, a 3D mapping table having three axes such as RGB, wherein each of the axes includes N sampling points (N is, for example, 17). Therefore, the 3D lookup table may include NxNxN sampling points, and each of the sampling points may have a corresponding RGB output value. In general, the RGB output value of each of the sampling points is a value between 0 and 1.

In an embodiment, the processor 204 may update the 3D lookup table of the display S by performing a first pseudo gamma operation corresponding to the first pseudo gamma parameter, a color space conversion operation corresponding to the pseudo color space conversion matrix, and a second pseudo gamma operation corresponding to the second pseudo gamma parameter in sequence on the RGB output value of each of the sampling points.

Figure 4:
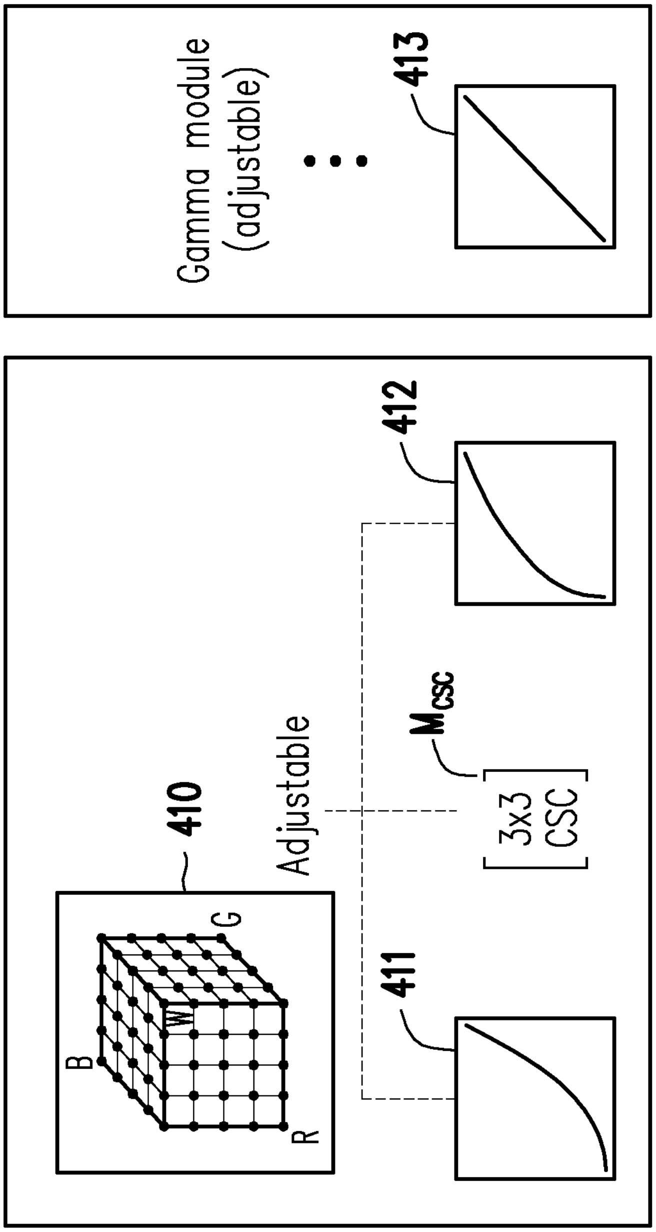
FIG. 4 is an application scenario diagram shown according to an embodiment of the disclosure.

In order to make the above concepts easier to understand, a further description is provided below with the aid of FIG. 4. FIG. 4 is an application scenario diagram shown according to an embodiment of the disclosure.

In FIG. 4, the processor 204 may set a gamma module 413 according to the gamma correction parameter obtained in step S330. Moreover, the processor 204 may set a first pseudo gamma module 411 according to the first pseudo gamma parameter obtained in step S340, and set a second pseudo gamma module 412 according to the second pseudo gamma parameter obtained in step S350.

Then, for the RGB output value of each of the sampling points in the 3D lookup table 410 of the display S, the processor 204 may perform in sequence: (1) the first pseudo gamma operation via the first pseudo gamma module 411; (2) the color space conversion operation based on the pseudo color space conversion matrix; and (3) the second pseudo gamma operation via the second pseudo gamma module 412. Thereby, the RGB output value of each of the sampling points in the 3D lookup table 410 of the display S may be updated accordingly.

Then, the display S may perform corresponding color correction based on the updated 3D lookup table 410.

In an embodiment, since the second pseudo gamma parameter (e.g., 1/2.2) used by the second pseudo gamma module 412 is determined based on the inverse gamma operation of the target gamma parameter (e.g., 2.2), the second pseudo gamma module 412 may be used to linearize the color corrected by the gamma module 413 (which corresponds to the target gamma parameter). This allows the processor 204 to perform a color space conversion operation in linear space based on the pseudo color space conversion matrix (i.e., $M_{CSC}$).

Moreover, after the processor 204 performs the color space conversion operation based on the pseudo color space conversion matrix (i.e., $M_{CSC}$) in the linear space, the native coordinate value of the color in the RGB space may be corrected to the corresponding target coordinate value accordingly.

Moreover, since the first pseudo gamma parameter (e.g., 2.2) used by the first pseudo gamma module 411 corresponds to the target gamma parameter, the operation performed by the first pseudo gamma module 411 may be understood to be used for compensating the operation performed by the second pseudo gamma module 412, but may not be limited thereto.

Figure 1A:
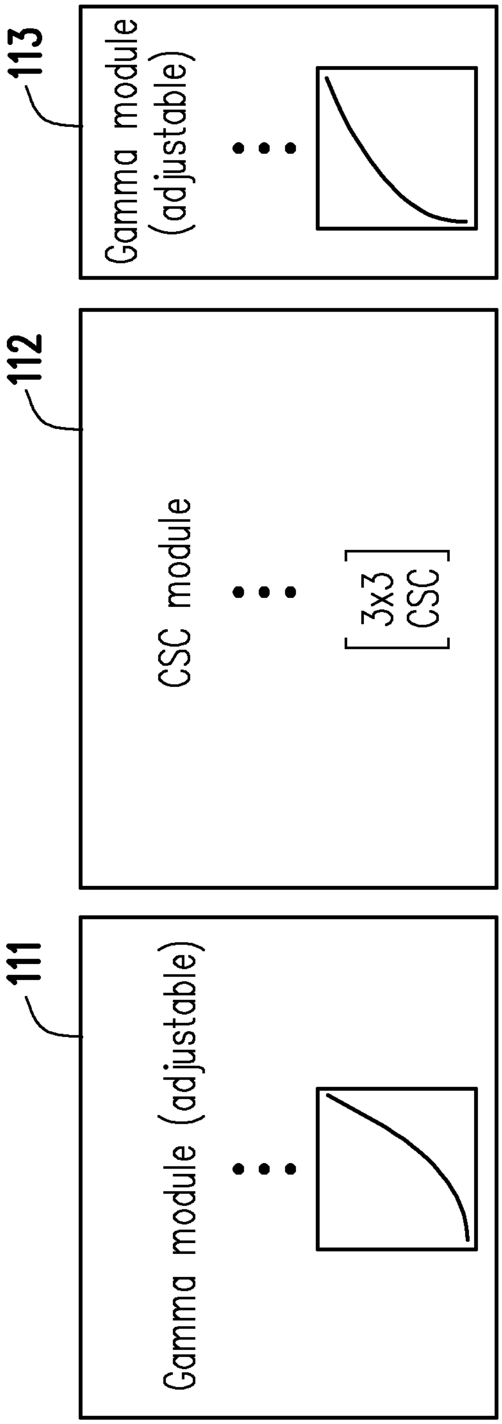
FIG. 1A is a schematic diagram of a conventional color calibration means.
Figure 1B:
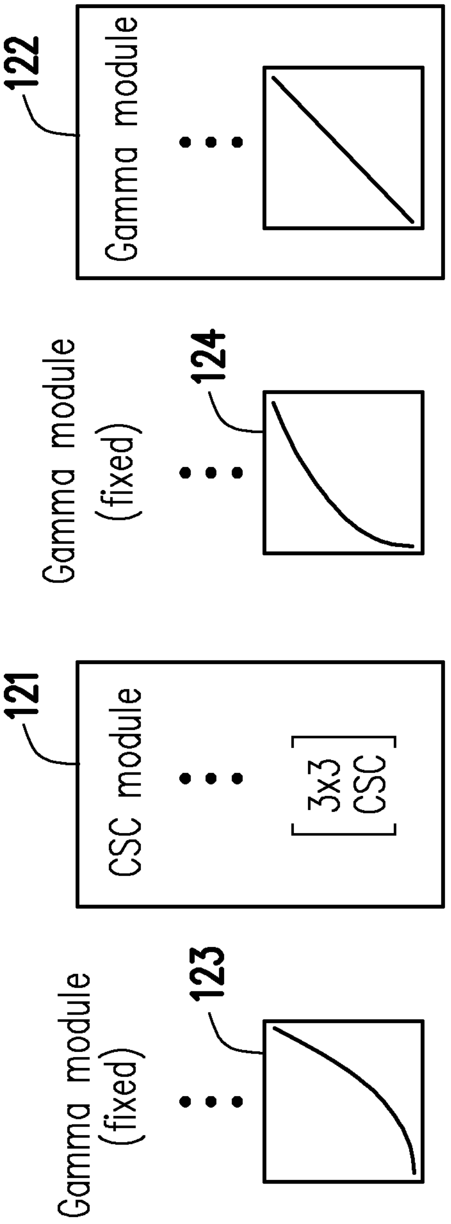
FIG. 1B is a schematic diagram of another conventional color calibration means.

Via the mechanism proposed by the embodiments of the disclosure, the color correction accuracy achieved is not only close to the performance of the architecture of FIG. 1A, but may also be better than the performance of the architecture of FIG. 1B.

Based on the above, in an embodiment of the disclosure, when a GPU developer provides a 3D lookup table and a gamma module of a display, the 3D lookup table is updated via the resulting first pseudo gamma parameter, pseudo color space conversion matrix, and second pseudo gamma parameter. In this way, accurate color correction may be performed according to different target color spaces, thereby improving user experience.

Although the disclosure has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. A color correction method, suitable for a color correction device, comprising:

obtaining native gamma information and native color point information of a display;

obtaining target gamma information and target color point information of a target color space;

obtaining at least one gamma correction parameter associated with the display based on the native gamma information and the target gamma information;

determining a first pseudo gamma parameter based on the target gamma information;

determining a second pseudo gamma parameter based on an inverse gamma operation of the target gamma information;

determining a pseudo color space conversion matrix based on the native color point information and the target color point information; and updating a 3D lookup table of the display based on the first pseudo gamma parameter, the pseudo color space conversion matrix, and the second pseudo gamma parameter in sequence.

2. The method of claim 1, wherein the at least one gamma correction parameter comprises a first gamma correction parameter corresponding to a first color, the native gamma information of the display comprises a first native gamma parameter of the first color, the target gamma information of the target color space comprises a first target gamma parameter of the first color, and the step of obtaining the at least one gamma correction parameter associated with the display based on the native gamma information and the target gamma information comprises:

performing a first gamma operation on the first native gamma parameter based on the first target gamma parameter to generate a first operation result;

performing a first inverse gamma operation on the first operation result based on the first native gamma parameter to generate a second operation result as the first gamma correction parameter corresponding to the first color.

3. The method of claim 1, wherein the target gamma information comprises a target gamma parameter, and the step of determining the first pseudo gamma parameter based on the target gamma information comprises:

setting the first pseudo gamma parameter as the target gamma parameter.

4. The method of claim 1, wherein the target gamma information comprises a target gamma parameter, and the step of determining the second pseudo gamma parameter based on the inverse operation of the target gamma information comprises:

determining the second pseudo gamma parameter based on the inverse gamma operation of the target gamma parameter.

5. The method of claim 1, wherein the native gamma information of the display comprises a plurality of color-specific native gamma information, and the target gamma information of the target color space comprises target gamma information of each of the colors.

6. The method of claim 1, wherein the native color point information of the display comprises a plurality of color-specific native color point information, and the target color point information of the target color space comprises target color point information of each of the colors.

7. The method of claim 1, wherein the native color point information of each of the colors comprises a native coordinate value of each of the colors in an XYZ space, the target color point information of each of the colors comprises a target coordinate value of each of the colors in the XYZ space, and the step of determining the pseudo color space conversion matrix based on the native color point information and the target color point information comprises:

determining a first matrix based on the native coordinate value of each of the colors in the XYZ space and a native coordinate value of each of the colors in an RGB space;

determine a target coordinate value of each of the colors in the RGB space based on the first matrix and the target coordinate value of each of the colors in the XYZ space;

determining the pseudo color space conversion matrix based on the native coordinate value of each of the colors in the RGB space and the target coordinate value of each of the colors in the RGB space.

8. The method of claim 7, wherein the colors comprise a first color, a second color, a third color, and a reference color, and the first matrix is characterized as:

$$M_1 = \begin{bmatrix} r_{R_S} & r_{G_S} & r_{B_S} & r_{W_S} \\ g_{R_S} & g_{G_S} & g_{B_S} & g_{W_S} \\ b_{R_S} & b_{G_S} & b_{B_S} & b_{W_S} \end{bmatrix} \begin{bmatrix} X_{R_S} & X_{G_S} & X_{B_S} & X_{W_S} \\ Y_{R_S} & Y_{G_S} & Y_{B_S} & Y_{W_S} \\ Z_{R_S} & Z_{G_S} & Z_{B_S} & Z_{W_S} \end{bmatrix}^{-1},$$

wherein $(r_{R_S}, g_{R_S}, b_{R_S})$ is the native coordinate value of the first color in the RGB space, $(r_{G_S}, g_{G_S}, b_{G_S})$ is the native coordinate value of the second color in the RGB space, $(r_{B_S}, g_{B_S}, b_{B_S})$ is the native coordinate value of the third color in the RGB space, $(r_{W_S}, g_{W_S}, b_{W_S})$ is the native coordinate value of the reference color in the RGB space, $(X_{R_S}, Y_{R_S}, Z_{R_S})$ is the native coordinate value of the first color in the XYZ space, $(X_{G_S}, Y_{G_S}, Z_{G_S})$ is the native coordinate value of the second color in the XYZ space, $(X_{B_S}, Y_{B_S}, Z_{B_S})$ is the native coordinate value of the third color in the XYZ space, and $(X_{W_S}, Y_{W_S}, Z_{W_S})$ is the native coordinate value of the reference color in the XYZ space.

9. The method of claim 8, wherein the target coordinate value of each of the colors in the RGB space is characterized as:

$$\begin{bmatrix} r_{R_T} & r_{G_T} & r_{B_T} & r_{W_T} \\ g_{R_T} & g_{G_T} & g_{B_T} & g_{W_T} \\ b_{R_T} & b_{G_T} & b_{B_T} & b_{W_T} \end{bmatrix} = M_1 \begin{bmatrix} X_{R_T} & X_{G_T} & X_{B_T} & X_{W_T} \\ Y_{R_T} & Y_{G_T} & Y_{B_T} & Y_{W_T} \\ Z_{R_T} & Z_{G_T} & Z_{B_T} & Z_{W_T} \end{bmatrix},$$

wherein $(r_{R_T}, g_{R_T}, b_{R_T})$ is the target coordinate value of the first color in the RGB space, $(r_{G_T}, g_{G_T}, b_{G_t})$ is the target coordinate value of the second color in the RGB space, $(r_{B_T}, g_{B_T}, b_{B_T})$ is the target coordinate value of the third color in the RGB space, $(r_{W_T}, g_{W_T}, b_{W_T})$ is the target coordinate value of the reference color in the RGB space, $(X_{R_T}, Y_{R_T}, Z_{R_T})$ is the target coordinate value of the first color in the XYZ space, $(X_{G_T}, Y_{G_T}, Z_{G_T})$ is the target coordinate value of the second color in the XYZ space, $(X_{B_T}, Y_{B_T}, Z_{B_T})$ is the target coordinate value of the third color in the XYZ space, and $(X_{W_T}, Y_{W_T}, Z_{W_T})$ is the target coordinate value of the reference color in the XYZ space.

10. The method of claim 9, wherein the pseudo color space conversion matrix is characterized as:

$$M_{CSC} = \begin{bmatrix} r_{R_T} & r_{G_T} & r_{B_T} & r_{W_T} \\ g_{R_T} & g_{G_T} & g_{B_T} & g_{W_T} \\ b_{R_T} & b_{G_T} & b_{B_T} & b_{W_T} \end{bmatrix} \begin{bmatrix} r_{R_S} & r_{G_S} & r_{B_S} & r_{W_S} \\ g_{R_S} & g_{G_S} & g_{B_S} & g_{W_S} \\ b_{R_S} & b_{G_S} & b_{B_S} & b_{W_S} \end{bmatrix}^{-1}.$$

11. The method of claim 1, wherein the 3D lookup table comprises individual RGB output values of a plurality of sampling points, and the step of updating the 3D lookup table of the display based on the first pseudo gamma parameter, the pseudo color space conversion matrix, and the second pseudo gamma parameter in sequence comprises:

updating the 3D lookup table of the display by performing a first pseudo gamma operation corresponding to the first pseudo gamma parameter, a color space conversion operation corresponding to the pseudo color space conversion matrix, and a second pseudo gamma operation corresponding to the second pseudo gamma parameter in sequence on the RGB output value of each of the sampling points.

12. A color correction device, comprising:

a non-transitory storage circuit storing a program code;

a processor coupled to the non-transitory storage circuit and accessing the program code to perform:

obtaining native gamma information and native color point information of a display;

obtaining target gamma information and target color point information of a target color space;

obtaining at least one gamma correction parameter associated with the display based on the native gamma information and the target gamma information;

determining a first pseudo gamma parameter based on the target gamma information;

determining a second pseudo gamma parameter based on an inverse gamma operation of the target gamma information;

determining a pseudo color space conversion matrix based on the native color point information and the target color point information; and updating the 3D lookup table of the display based on the first pseudo gamma parameter, the pseudo color space conversion matrix, and the second pseudo gamma parameter in sequence.

13. The color correction device of claim 12, wherein the native color point information of each of the colors comprises a native coordinate value of each of the colors in an XYZ space, the target color point information of each of the colors comprises a target coordinate value of each of the colors in the XYZ space, and the processor performs:

determining a first matrix based on the native coordinate value of each of the colors in the XYZ space and a native coordinate value of each of the colors in an RGB space;

determine a target coordinate value of each of the colors in the RGB space based on the first matrix and the target coordinate value of each of the colors in the XYZ space;

determining the pseudo color space conversion matrix based on the native coordinate value of each of the colors in the RGB space and the target coordinate value of each of the colors in the RGB space.

14. The color correction device of claim 13, wherein the colors comprise a first color, a second color, a third color, and a reference color, and the first matrix is characterized as:

$$M_1 = \begin{bmatrix} r_{R_S} & r_{G_S} & r_{B_S} & r_{W_S} \\ g_{R_S} & g_{G_S} & g_{B_S} & g_{W_S} \\ b_{R_S} & b_{G_S} & b_{B_S} & b_{W_S} \end{bmatrix} \begin{bmatrix} X_{R_S} & X_{G_S} & X_{B_S} & X_{W_S} \\ Y_{R_S} & Y_{G_S} & Y_{B_S} & Y_{W_S} \\ Z_{R_S} & Z_{G_S} & Z_{B_S} & Z_{W_S} \end{bmatrix}^{-1},$$

wherein $(r_{R_S}, g_{R_S}, b_{R_S})$ is the native coordinate value of the first color in the RGB space, $(r_{G_S}, g_{G_S}, b_{G_S})$ is the native coordinate value of the second color in the RGB space, $(r_{B_S}, g_{B_S}, b_{B_S})$ is the native coordinate value of the third color in the RGB space, $(r_{W_S}, g_{W_S}, b_{W_S})$ is the native coordinate value of the reference color in the RGB space, $(X_{R_S}, Y_{R_S}, Z_{R_S})$ is the native coordinate value of the first color in the XYZ space, $(X_{G_S}, Y_{G_S}, Z_{G_S})$ is the native coordinate value of the second color in the XYZ space, $(X_{B_S}, Y_{B_S}, Z_{B_S})$ is the native coordinate value of the third color in the XYZ space, and $(X_{W_S}, Y_{W_S}, Z_{W_S})$ is the native coordinate value of the reference color in the XYZ space.

15. The color correction device of claim 14, wherein the target coordinate value of each of the colors in the RGB space is characterized as:

$$\begin{bmatrix} r_{R_T} & r_{G_T} & r_{B_T} & r_{W_T} \\ g_{R_T} & g_{G_T} & g_{B_T} & g_{W_T} \\ b_{R_T} & b_{G_T} & b_{B_T} & b_{W_T} \end{bmatrix} = M_1 \begin{bmatrix} X_{R_T} & X_{G_T} & X_{B_T} & X_{W_T} \\ Y_{R_T} & Y_{G_T} & Y_{B_T} & Y_{W_T} \\ Z_{R_T} & Z_{G_T} & Z_{B_T} & Z_{W_T} \end{bmatrix},$$

wherein $(r_{R_T}, g_{R_T}, b_{R_T})$ is the target coordinate value of the first color in the RGB space, $(r_{G_T}, g_{G_T}, b_{G_T})$ is the target coordinate value of the second color in the RGB space, $(r_{B_T}, g_{B_T}, b_{B_T})$ is the target coordinate value of the third color in the RGB space, $(r_{W_T}, g_{W_T}, b_{W_T})$ is the target coordinate value of the reference color in the RGB space, $(X_{R_T}, Y_{R_T}, Z_{R_T})$ is the target coordinate value of the first color in the XYZ space, $(X_{G_T}, Y_{G_T}, Z_{G_T})$ is the target coordinate value of the second color in the XYZ space, $(X_{B_T}, Y_{B_T}, Z_{B_T})$ is the target coordinate value of the third color in the XYZ space, and $(X_{W_T}, Y_{W_T}, Z_{W_T})$ is the target coordinate value of the reference color in the XYZ space.

16. The color correction device of claim 15, wherein the pseudo color space conversion matrix is characterized as:

$$M_{CSC} = \begin{bmatrix} r_{R_T} & r_{G_T} & r_{B_T} & r_{W_T} \\ g_{R_T} & g_{G_T} & g_{B_T} & g_{W_T} \\ b_{R_T} & b_{G_T} & b_{B_T} & b_{W_T} \end{bmatrix} \begin{bmatrix} r_{R_S} & r_{G_S} & r_{B_S} & r_{W_S} \\ g_{R_S} & g_{G_S} & g_{B_S} & g_{W_S} \\ b_{R_S} & b_{G_S} & b_{B_S} & b_{W_S} \end{bmatrix}^{-1}.$$

* * * * *